UNITED STATES PATENT OFFICE.

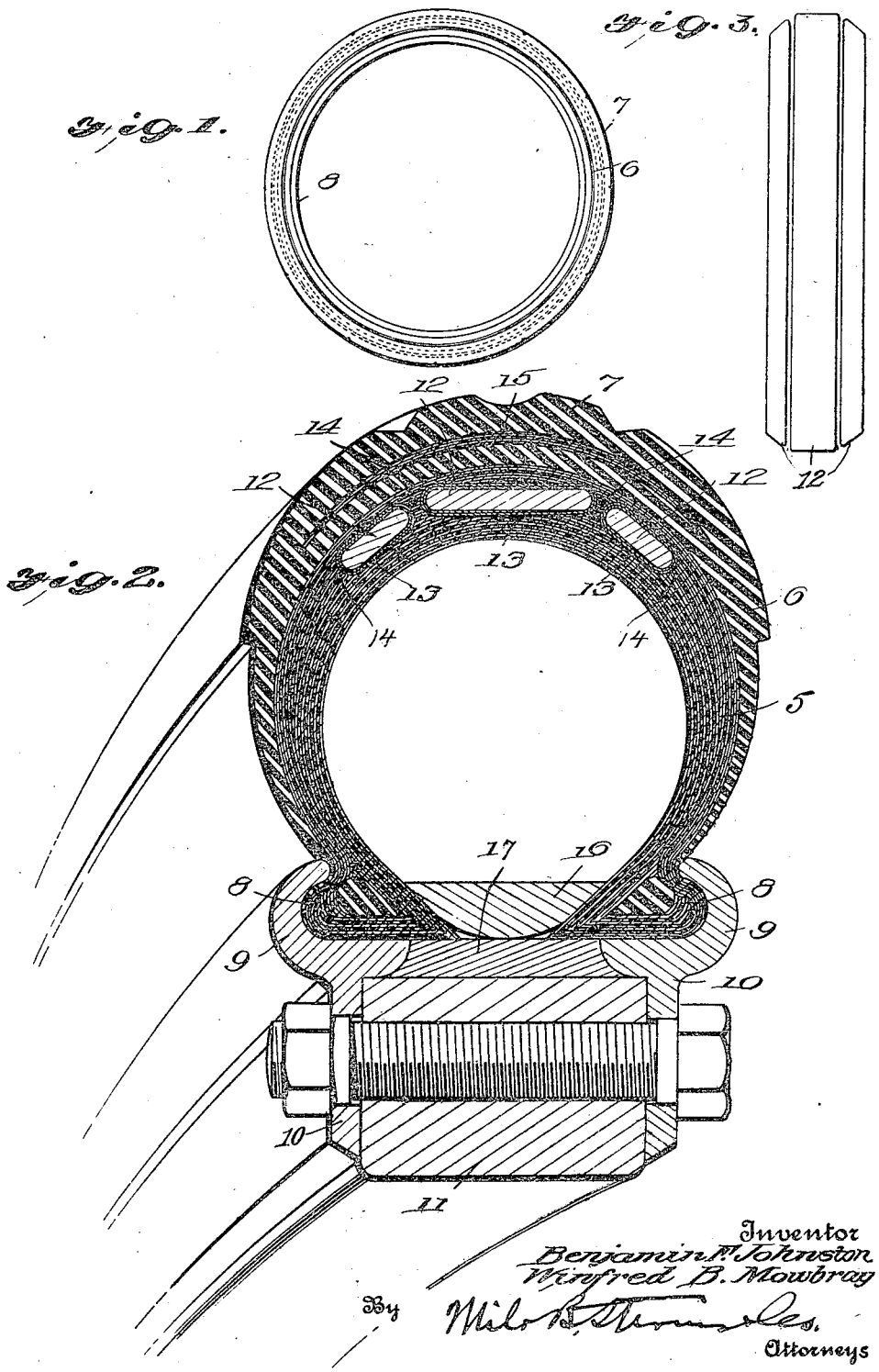

BENJAMIN F. JOHNSTON AND WINFRED B. MOWBRAY, OF OGDEN, UTAH.

TIRE.

1,259,748.  Specification of Letters Patent.  Patented Mar. 19, 1918.

Application filed April 4, 1917. Serial No. 159,754.

*To all whom it may concern:*

Be it known that we, BENJAMIN F. JOHNSTON and WINFRED B. MOWBRAY, citizens of the United States, residing at Ogden, in the county of Weber and State of Utah, have invented new and useful Improvements in Tires, of which the following is a specification.

This invention relates to vehicle tires which are resilient, and its object is to provide a tire of this kind in which the necessary resiliency is obtained without air inflation, thereby avoiding the difficulties and defects of the pneumatic tires commonly used.

The object stated is attained by means of a novel combination and arrangement of parts to be hereinafter described and claimed, and in order that the same may be better understood, reference is had to the accompanying drawing forming a part of this specification.

Figure 1 is an elevation of the tire;

Fig. 2 is an enlarged cross-section thereof, and

Fig. 3 is an edge view of the three rings embedded in the tire showing their normal relative position when in place.

Referring specifically to the drawing, the body of the tire which is the subject matter of the present application for patent is made up of a core composed of several plies of vulcanized fabric 5 and an outer covering 6 of rubber having the greatest thickness at the tread portion of the tire, as shown at 7. In cross section, the tire is in all respects similar to the casing of an ordinary pneumatic tire, with the usual clencher beads 8 for engagement by the flanged portions 9 of the rim members 10 carried by the wheel felly 11.

In the body of the tire are embedded a number of metallic rings 12 which are rigid so that their circular contour is not changed when a load is placed thereon. The resiliency of the tire is obtained solely by the inherent resiliency of its wall composed of the fabric 5 and the rubber covering 6.

In the manufacture of the tire the rings 12 are fitted into the core 5 after the first or second ply is applied, and after the rings are wrapped with some of the fabric as denoted by the reference character 13 the spaces between the rings at the edges thereof are filled with a mixture of fabric and rubber, as shown at 14, until the proper cross-sectional contour of the tire is again obtained. The other plies of fabric are next applied until the rings are completely covered and inclosed in the core. During this process, the fabric is vulcanized to the rings. The rubber covering 6 is next applied in the ordinary manner, additional plies of fabric 15 being embedded in the tread portion 7.

The rings 12 are continuous and extend entirely around the tire. One ring is located directly beneath the center of the tread 7 and there is a ring on each side thereof. The three rings are flat in cross section, with their edges rounded to prevent cutting of the fabric. Normally, the three rings do not extend in a straight line across the tire, the side rings being located inwardly of the middle ring. The middle ring bears most of the load, and the two side rings take the load when it becomes great enough to force them outward in line with the middle ring. The load is thus distributed around the entire tire in three different circles.

The middle one of the rings 12 is of uniform diameter throughout its entire width, and it is also considerably wider than the side rings. It will be noted, however, that the side rings are not of uniform diameter throughout their entire width, their greater diameter being at their inner edges or the edges which are next to the middle ring. The three rings, when assembled, therefore conform substantially to the transverse curvature of the tread portion of the tire, and they hold the body of the tire in shape, rendering it impossible for the sides thereof to bend inward which would break the rubber away from the fabric and cause the plies of fabric to separate and thereby shorten the life of the tire. The side rings hold the sides of the tire body in the shape they were originally formed, so that the resisting qualities of the tire are retained. If a sufficient load is placed on the tire to force the rubber and fabric body thereof to bend, this tends to bring the three rings toward a horizontal alinement at the bottom of the tire which has the effect of increasing the difference in the relative height of the rings. The fabric and rubber body of the tire resists this motion as the wheel turns, which, together with the sides of the tire body, gives the tire the requisite resiliency. A single ring curved in cross-section would correct the tendency of the tire to flatten, but it would destroy the resiliency.

The tire can be easily and cheaply manufactured, and it has sufficient resiliency and easy riding qualities to take the place of pneumatic tires, and as it is not air-inflated, all troubles and inconveniencies from punctures are done away with. The tire has the same shape as the ordinary pneumatic tire, and it therefore does not change the appearance of the wheel to which it is fitted.

In connection with the tire there is employed a retaining ring 16 fitting inside the tire between the clencher beads 8 thereof. This ring seats on a base ring 17 encircling the felly 11, and holds the base portions of the tire spaced apart and tightly pressed outward against the flanges 9 of the rim members. The tire cannot slip outward as the beads 8 are held between the ring 16 and the flanges 9.

We claim:—

1. A non-inflatable resilient tire composed of a body of resilient fabric, and a series of separate metallic rings embedded in said fabric beneath the tread portion of the tire and having sufficient inherent rigidity to resist deformation under loads, one of said rings being at the center of the tread portion of the tire, and the other rings being at the sides thereof, the center ring being of uniform diameter throughout its entire width, and the side rings having a greater diameter at their edges which are next to the center ring than at their outer edges.

2. A non-inflatable resilient tire composed of a body of resilient fabric, and a series of separate metallic rings embedded in said fabric beneath the tread portion of the tire and having sufficient inherent rigidity to resist deformation under load, one of said rings being at the center of the tread portion of the tire, and the other rings being at the sides thereof, the center ring being of uniform diameter throughout its entire width, and the side rings having a greater diameter at their edges which are next to the center ring than at their outer edges, and the width of the side rings being also less than the width of the center ring.

In testimony whereof we affix our signatures.

BENJAMIN F. JOHNSTON.
WINFRED B. MOWBRAY.

Copies of this patent may be obtained for five cents each, by addressing the "Commissioner of Patents, Washington, D. C."